(12) United States Patent
Hill et al.

(10) Patent No.: US 6,964,389 B2
(45) Date of Patent: Nov. 15, 2005

(54) FISHING REEL

(75) Inventors: Doug Hill, P.O. Box 568, New Boston, NH (US) 03070-0568; Mark J. McMenemy, Northborough, MA (US)

(73) Assignee: Doug Hill, New Boston, NH (US)

( * ) Notice: Subject to any disclaimer, the term of this patent is extended or adjusted under 35 U.S.C. 154(b) by 0 days.

(21) Appl. No.: 10/730,500

(22) Filed: Dec. 5, 2003

(65) Prior Publication Data

US 2004/0173705 A1 Sep. 9, 2004

Related U.S. Application Data

(63) Continuation-in-part of application No. 10/094,386, filed on Mar. 8, 2002, now abandoned.

(51) Int. Cl.[7] .............................................. A01K 89/02
(52) U.S. Cl. ...................... 242/301; 242/285; 242/290; 242/291; 242/303; 242/304
(58) Field of Search ................................ 242/294, 317, 242/290, 291, 292, 301, 303, 304

(56) References Cited

U.S. PATENT DOCUMENTS

| 1,379,692 A | | 5/1921 | Pflueger |
| 2,180,566 A | * | 11/1939 | Thompson ................. 242/295 |
| 2,189,952 A | * | 2/1940 | Guy ........................... 242/293 |
| 2,813,601 A | | 11/1957 | Bourgues ..................... 188/92 |
| 2,858,636 A | | 11/1958 | Stipe ............................. 43/25 |
| 3,315,913 A | * | 4/1967 | Grieten ....................... 242/271 |
| 3,556,428 A | | 1/1971 | Hayler ..................... 242/84.52 |
| 3,670,985 A | | 6/1972 | Morishita ................ 242/84.43 |
| 4,026,493 A | | 5/1977 | Anderson ............... 242/84.1 R |
| 4,067,512 A | | 1/1978 | Nepote ................... 242/84.5 R |
| 4,657,201 A | * | 4/1987 | Munroe ...................... 242/265 |
| 4,733,830 A | * | 3/1988 | Hollander ................... 242/292 |
| 4,832,278 A | * | 5/1989 | Sugeta ........................ 242/282 |
| 4,932,602 A | | 6/1990 | Scott ............................ 242/99 |
| 4,966,336 A | | 10/1990 | Humble et al. ............. 242/295 |
| 5,195,267 A | | 3/1993 | Daniels ...................... 43/18.1 |
| 5,248,113 A | | 9/1993 | Daniels ...................... 242/246 |
| 5,505,396 A | | 4/1996 | Chesterfield et al. ....... 242/298 |
| 6,003,798 A | * | 12/1999 | Kim ........................... 242/289 |
| 6,045,076 A | | 4/2000 | Daniels ...................... 242/287 |
| 6,065,699 A | | 5/2000 | Sacconi ...................... 242/286 |
| 6,076,640 A | | 6/2000 | Carlson ..................... 188/82.1 |
| 6,116,531 A | | 9/2000 | Young ........................ 242/301 |
| 6,296,200 B1 | | 10/2001 | Chang ........................ 242/317 |
| 6,732,965 B2 | * | 5/2004 | Bascue, Jr. ................. 242/304 |

* cited by examiner

Primary Examiner—Kathy Matecki
Assistant Examiner—E. Langdon
(74) Attorney, Agent, or Firm—Bourque & Associates (57) ABSTRACT

A fishing reel includes an adjustable dynamic drag mechanism and a static drag mechanism connected to a brake mechanism. The static drag mechanism allows a user to select a predetermined amount of static drag whereas the manually adjustable dynamic drag mechanism allows the user to instantly add more drag. The fishing reel also allows a user to set a maximum total drag (i.e., the combination of the static and the maximum dynamic drag) such that the user cannot accidentally add too much dynamic drag that could result in the total drag exceeding the strength of the fishing line. The fishing reel preferably includes an adjustable leverage mechanism that allows the user to select the desired amount of mechanical advantage. In the preferred embodiment, the brake mechanism includes a ratchet plate, a yoke, and a friction ring disposed between the plate and the yoke.

9 Claims, 11 Drawing Sheets

FISHING REEL

CROSS-REFERENCE TO RELATED APPLICATIONS

This is a continuation-in-part of U.S. patent application Ser. No. 10/094,386, filed Mar. 8, 2002 now abandoned.

TECHNICAL FIELD

The present invention relates to fishing reels and more particularly, to fishing reels having both a static and a manually adjustable line drag in which the static and manually adjustable drag may be set independently and an adjustable, maximum and minimum total drag may be set.

BACKGROUND INFORMATION

When a fish takes a hook and starts to run, a very rapid pay out of the line under some resistance is highly desirable. This resistance is commonly referred to as "drag" and its purpose is to prevent the reel from overrunning (minimum drag) plus adding resistance (maximum drag) to a running fish as well as to tire the fish and enable the fisherman to reel in the fish before it takes off for a subsequent run, the procedure being repeated until the fish is brought in and landed or escapes.

It is known to provide a drag mechanism between the spool and its carrier that allows the spool to rotate relatively freely in one direction with respect to the carrier while in the opposite direction of rotation a resistance is imparted to the spool's rotation. Typically, the drag is provided by axially clamping the spool, and there are many known methods of accomplishing this. For example, the spool may be clamped using washers, drums, or disc brake systems.

It is also highly desirable to have a manually adjustable dynamic drag mechanism in addition to the static drag. When fighting large, powerful fish, it is common for the fish to take hundreds of yards of line. A manual levered drag allows a smooth increase in drag against the run, which shortens the run and more quickly tires the fish. In the event the fish jumps or surges, the levered additional drag may be released instantly by releasing the lever, therefore not allowing the line to be broken.

Traditionally, users have added additional drag by placing the palm of their hand on the spool and adding or reducing the amount of force applied against the spool. This method, however, suffers from several known problems. For example, there is a high risk of injury to the user's hand as a result of the spool spinning very quickly.

It has been attempted to provide a fishing reel which has both a manually adjustable static drag brake and a manually engagable brake for selectively adding resistance to the spool. These reels typically use a button or a knob and are difficult to use and suffer from several disadvantages. A major problem with the known reels is that the user cannot adjust the total drag quickly and accurately enough while fighting a fish. While fighting a fish, it is often imperative that the user be able to very quickly and accurately adjust the total amount of drag (e.g., if a fish jumps, a user must be able to almost instantly adjust the total drag). Because of the difficulty in accessing the known reels, as well as the inability of the user to adequately judge how much drag is being added or reduced, the total amount of drag is often not correct and results in too much or too little total drag. This has lead users to simply use the known drag mechanisms as a static drag.

Yet another problem is that the button/knob is positioned on the side of the reel. While fighting a strong fish, it is often necessary to have both hands holding the rod/reel while simultaneously being able to dynamically adjust the total drag. Having the button/knob on the side of the reel requires a user to remove one of his/her hands from the rod/reel and place it on the side of the reel where the user cannot generate any strength. As a result, these reels in essence actually employ two static drag mechanisms.

When fishing for multiple types/sizes of fish, the fisherman often needs to be able to quickly add greatly varying amounts of resistance. For example, when fishing for small fish, the user may want to add 3–5 lbs. of additional drag while in contrast, when fishing for larger fish the user may want to add 10–15 lbs. of additional drag. Unfortunately, there is no way to easily change the leverage exerted by the button so as to change to amount of drag a certain amount a given amount of hand pressure will generate. As a result, it is difficult for a user to know how much force to exert on the button to add a given amount of additional drag. Moreover, because the leverage of the button is fixed, the fishing reel is not suitable for fishing for a wide variety of fish because the leverage added will be either too high (in which case a small amount of pressure exerted on the button will generate too much additional drag) or too low (in which case the user will not be able to add enough additional drag). Yet another problem associate with the use of a button is that it is difficult for a user to use, especially when the user is wearing gloves.

Another problem associated with the known reels which have both a manually adjustable static drag brake and a manually engagable brake is that there is no way to set the maximum total drag. All fishing line has a maximum line strength or test. When the force exerted on the fishing line (i.e., the combination of the force exerted by the fish and the total drag added by the reel) exceeds the maximum strength of the fishing line, the line is liable to break resulting in the fish escaping. Accordingly, it is important that while adding the manually engageable drag (especially in combination with the a static drag) that the user does not add too much additional drag such that the total drag exceeds the strength of the fishing line. This problem is further exacerbated by the fact that the known reels utilize a button for adding the manually engageable brake which is difficult to use and difficult to add a precise amount of resistance.

Another known type of fishing reel includes a lever for reduce spool backlash. During the casting process, line is left off the spool at a high rate. Because the line is wound around the spool, the spool rotates very quickly as the line is left off. This rotation generates momentum that results in the spool rotating even after the end the fishing line has stopped moving. With a normal real, this additional rotation results in excess line being let out which may become tangled and must, at a minimum, be wound back up. On a fly fishing reel, however, this backlash is not a problem because the line is drawn off the spool prior to casting, thus the spool does not rotate during the casting process.

Accordingly, what is needed is a fishing reel in which the total maximum drag can be set such that the total drag does not exceed the strength of the fishing line. The fishing reel should preferably have both an adjustable static drag as well as a manually adjustable dynamic drag. Furthermore, what is needed is a fishing reel that is easily operated such that the user can quickly and easily adjust the both the static and the dynamic drag, even while wearing gloves. The fishing reel should have an adjustable drag to input force ratio allowing the fisherman to apply greatly varying amounts of added resistance.

SUMMARY

The present invention features a fishing reel drag mechanism having a rotatable spool for storing a fishing line, a frame for supporting the rotatable spool, a manually adjustable dynamic drag mechanism, and a static drag brake mechanism.

The static drag brake mechanism allows a user to select a desired amount of static drag. In one embodiment, the static drag brake member includes a brake member and a static drag adjuster. The brake member is adjustably disposed on the frame and applies the selected amount of static drag against the spool. The brake member may include any known braking system, but preferably includes a rotor and a caliper.

In the preferred embodiment, the static drag adjuster includes a static drag selection device and an adjustment link pin. The static drag selection device allows the user to select the amount of static drag and includes a static drag adjustment cam that is disposed between the static drag selection device and the frame. The static drag adjustment cam preferably includes a channel having a circumferentially decreasing radius.

The adjustment link pin is disposed between the static drag adjustment cam and the brake member. In practice, the user selects the desired amount of static drag by rotating the static drag selection device, thereby rotating the static drag adjustment cam, which in turn moves the adjustment link pin thereby altering the force exerted by the brake member.

The manually adjustable dynamic drag mechanism allows a user to select a desired amount of dynamic drag. In one embodiment, the manually adjustable dynamic drag mechanism includes a dynamic brake member, a lever, an adjustable leverage mechanism, and linkage connecting the lever to the dynamic brake member. The dynamic brake member may include any known braking system, but preferably includes a rotor and a caliper.

The lever is disposed on an external surface of the frame and allows the user to apply the selected amount of dynamic drag against the rotatable spool. The lever facilitates the operation of the dynamic drag mechanism. The dynamic drag mechanism may also include an adjustable leverage mechanism that allows the user to select an amount of mechanical advantage.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
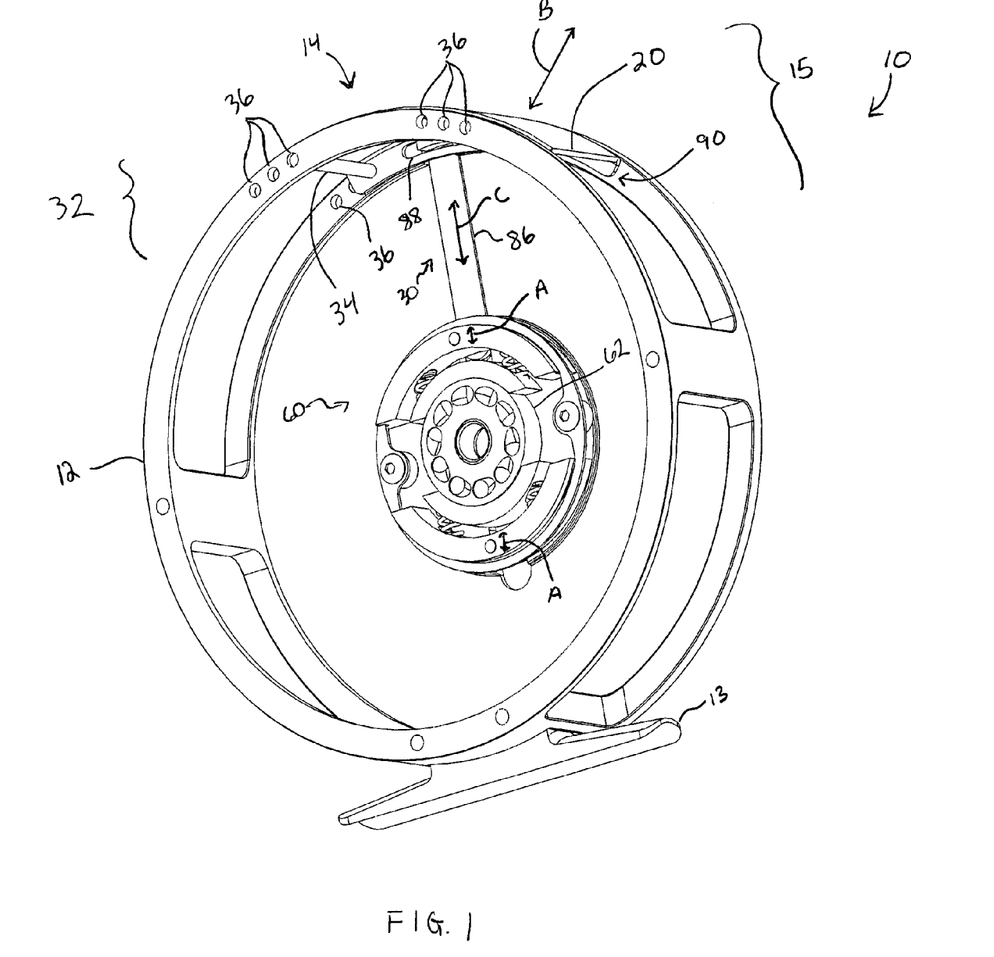
FIG. 1 is a perspective view of one embodiment of the fishing reel according to the present invention.

A fishing reel 10, FIG. 1, according to the present invention, includes a frame 12 connected to a fishing rod (not shown) using a traditional base 13 known to those skilled in the art. A spool (not shown) for storing fishing line is preferably connected to a ratchet plate 62 that is rotatably disposed about an axis of the frame 12 such that the spool may rotate relatively freely in one direction with respect to the frame 12, while in the opposite direction of rotation a resistance is imparted to the spool's rotation. This resistance is commonly referred to as "drag". There are two general purposes of drag. One purpose is to prevent any looseness in the fishing line that might allow a fish to jump and snap the line. The second purpose is to tire the fish and enable the fisherman to reel in the fish before it takes off for a subsequent run. The fishing reel 10 will be described as it relates to a fly fishing reel, though it may also be adapted for use with other traditional reels and such modifications are within the ordinary knowledge of one skilled in the art.

The fishing reel 10, according to the present invention, also includes a manually adjustable dynamic drag mechanism 14 as well as a static drag brake mechanism 16 which are connected to one or more brake mechanisms 60 as discussed in greater detail hereinbelow. The static drag brake mechanism 16 allows the user to select a predetermined amount of static or constant drag such that there is some initial resistance once the fish bites and takes off; whereas the manually adjustable dynamic drag mechanism 14 allows the user to instantly add additional drag as appropriate and adjust the total amount of drag while playing a hooked fish. It is self-evident that different types/sizes of fish will require different amounts of both static and dynamic drag.

An important feature of the present invention, discussed in greater detail below, is that the total drag (i.e., the combination of the drag generated by the dynamic drag mechanism 14 and the drag generated by the static drag mechanism 16) can be set to a predetermined maximum value. Being able to set the total maximum drag of the fishing reel 10 prevents the user from accidentally adding too much dynamic drag while fighting a fish and ensures that the total drag will never exceed the strength of the fishing line (not shown) which could result in the line breaking and the fish escaping.

As mentioned above, the fishing reel 10 includes at least one brake mechanism 60 that is connected to the dynamic and static drag mechanisms 14, 16 and generates the desired drag or friction. In the preferred embodiment, the dynamic drag mechanism 14 and the static drag mechanism 16 are both connected to a single brake mechanism 60, though each one may optionally have its own brake mechanism 60. The brake mechanism 60 may include any means of generating a force to reduce the rotation of the spool known to those skilled in the art such as, but not limited to, various types of clutches, disc and drum brake systems, cams, springs, belts, as well hydraulic systems or the like.

Figure 2A:
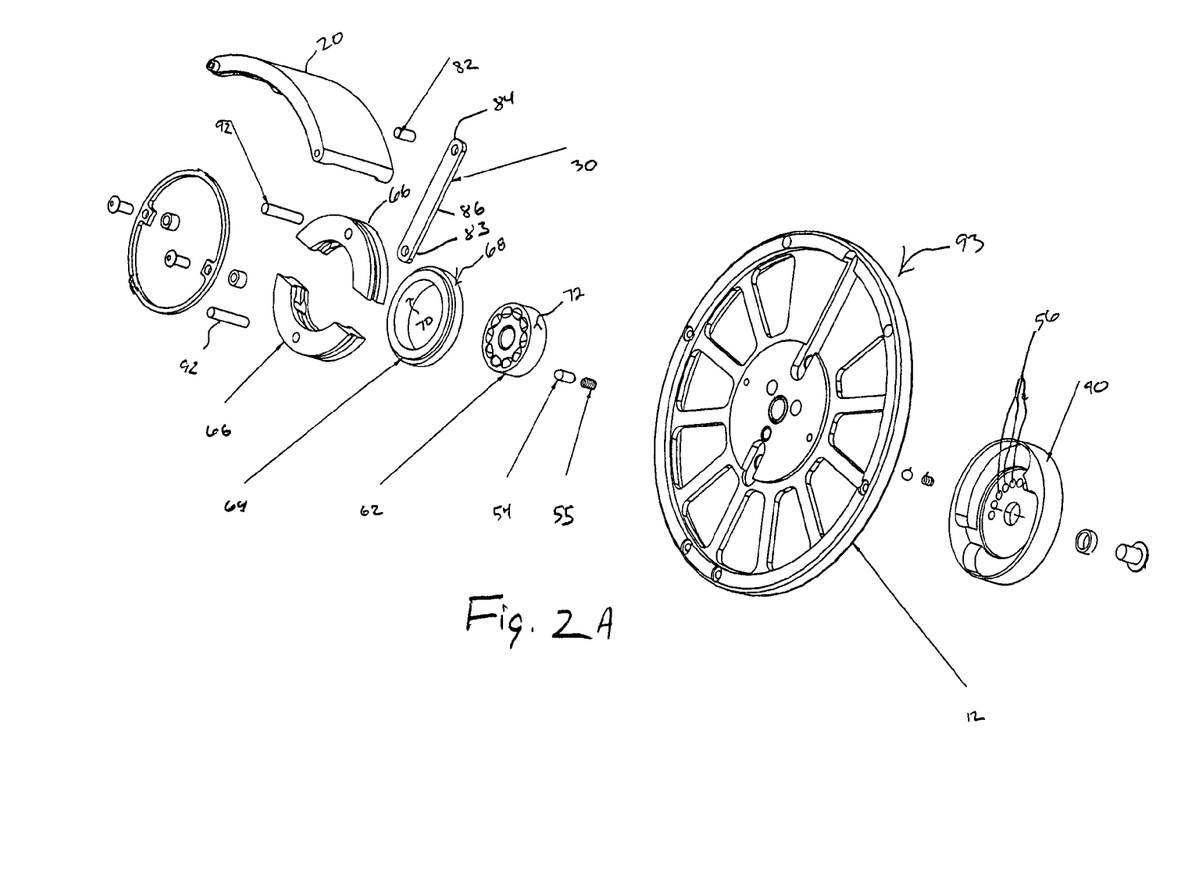
FIG. 2A is an exploded view of one embodiment of the fishing reel shown in FIG. 1 according to the present invention.

In the exemplary embodiment, the brake system 60, FIG. 2A, includes a ratchet plate 62 rotatably connected about the frame 12, a friction ring or drag ring 64 rotatably disposed about the perimeter of the ratchet plate 62, and one or more yokes 66 disposed about an outer perimeter of the friction ring 64. The friction ring 64 is preferably made from a composite material with properties similar to that of cork; however, any material known to those skilled in the art may be used. It is important to note that the user may change the properties of the friction ring 64 to alter the drag generated by the brake mechanism. This allows the user to tailor the fishing reel 10 for a wide variety of target fish species/sizes.

To generate drag, the yokes 66 are moved generally circumferentially inward in the direction of arrow A and generate a pressure against the outer surface 68 of the friction ring 64. This pressure is transmitted through the friction ring 64 and is applied by the inner surface 70 of the friction ring 64 against the outer surface 72 of the ratchet plate 62. The pressure exerted against outer surface 72 of the ratchet plate 62 impairs the ratchets plates ability to rotate, thus creating the desired drag.

Figure 2B:
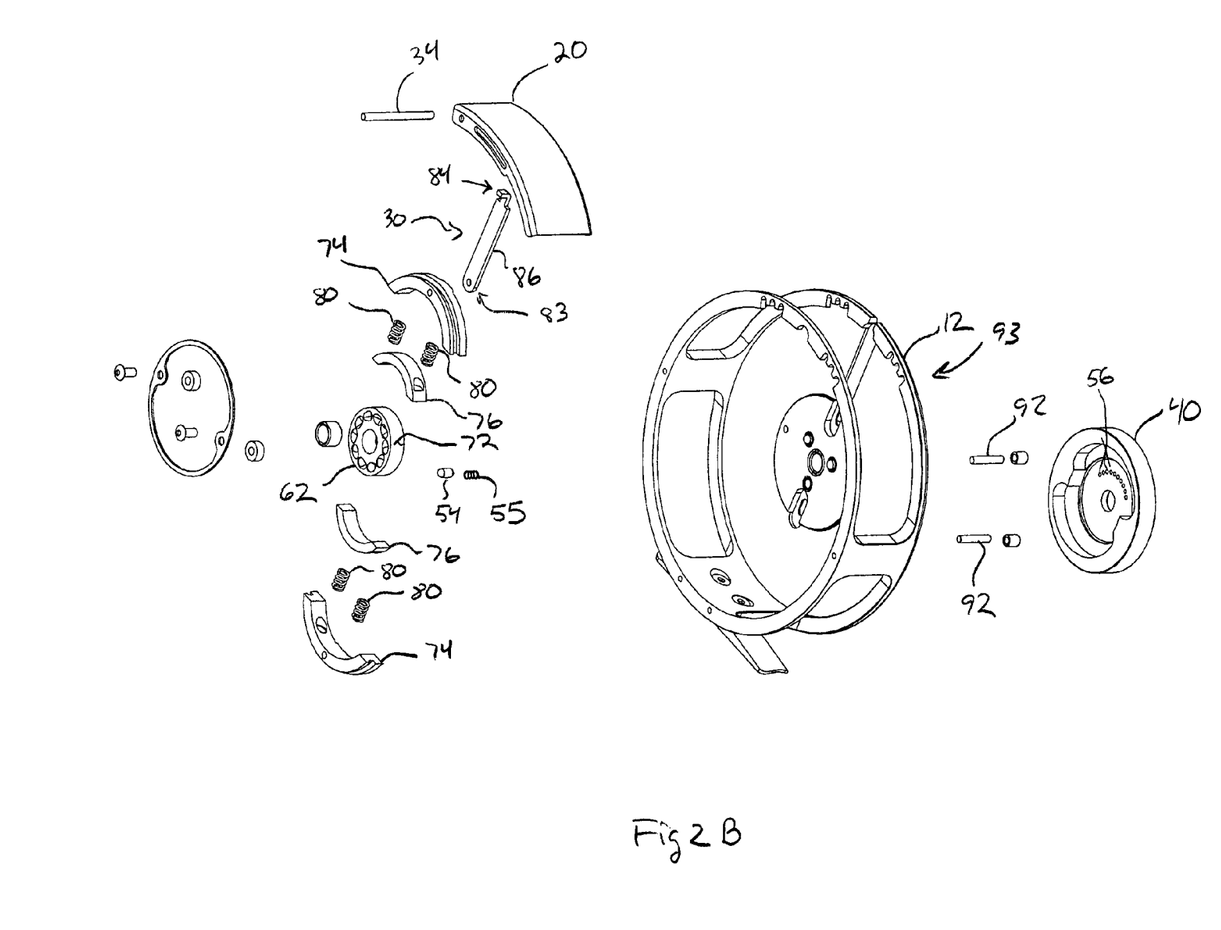
FIG. 2B is an exploded view of another embodiment of the fishing reel shown in FIG. 1 according to the present invention.
Figure 3A:
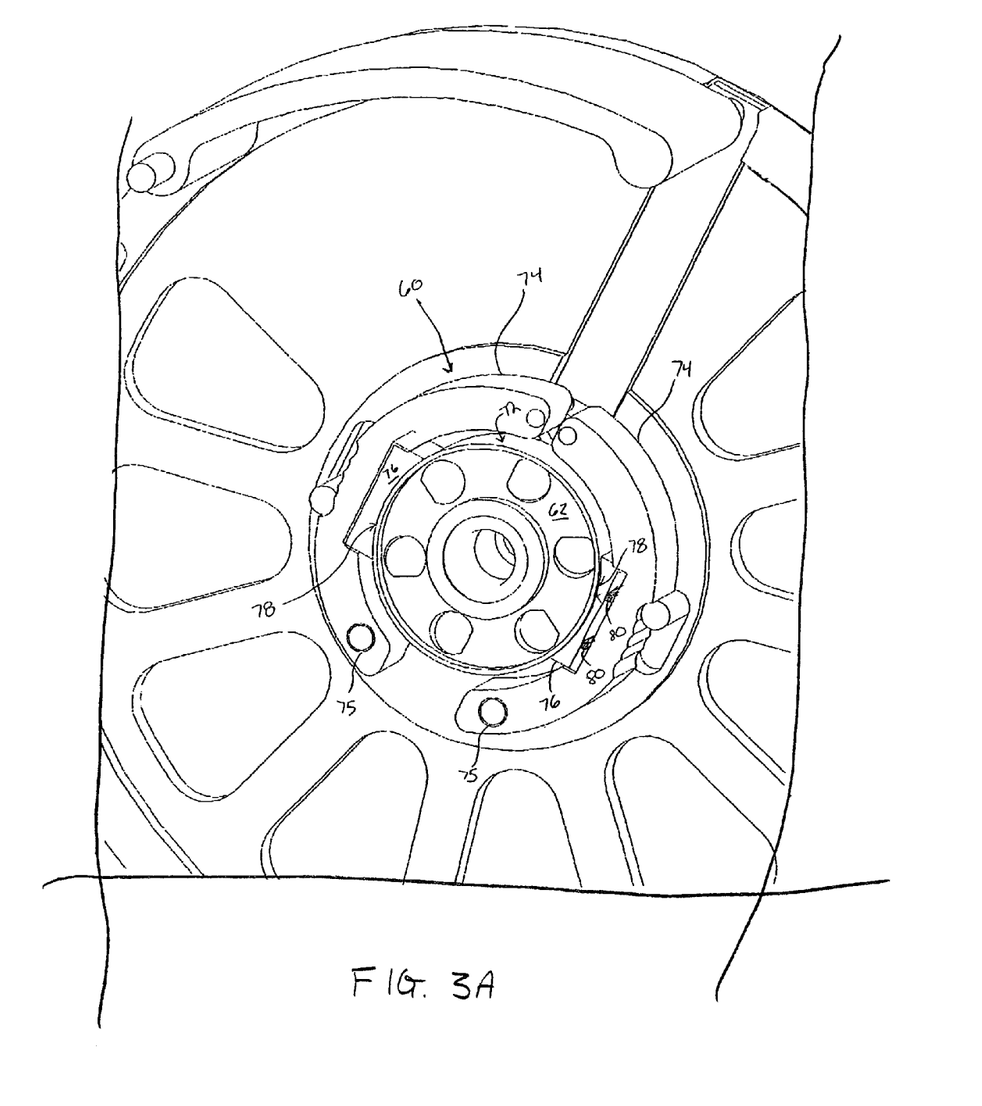
FIG. 3A is a perspective view of another embodiment of the brake mechanism according to the present invention.
Figure 3B:
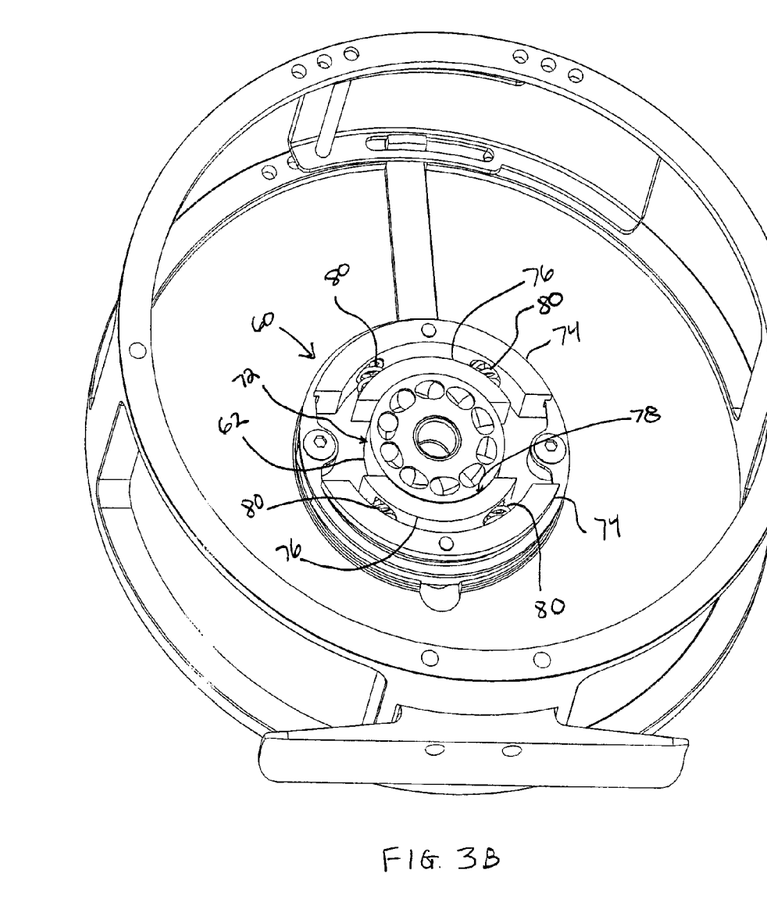
FIG. 3B is a perspective view of the brake mechanism shown in FIG. 2B according to one embodiment of the present invention.

Alternatively, the brake mechanism 60, FIGS. 2B and 3, may include one or more calipers 74 having a wear pad 76 and a rotor or ratchet plate 62. The caliper may include any design known to those skilled in the art, but is preferably rotatably disposed about a pivot 75 as shown in FIG 3A. To generate drag, a force is applied to the calipers 74 which is transferred to the outer surface 78 of the wear pad 76. The outer surface 78 of the wear pad 76 transmits a pressure against the outer surface 72 of the rotor or ratchet plate 62, thus creating the desired drag. In a further embodiment, one or more springs 80 may be disposed between the wear pad 76 and the caliper 74. The size of the springs 80 aid in regulating the amount of drag.

Figure 4:
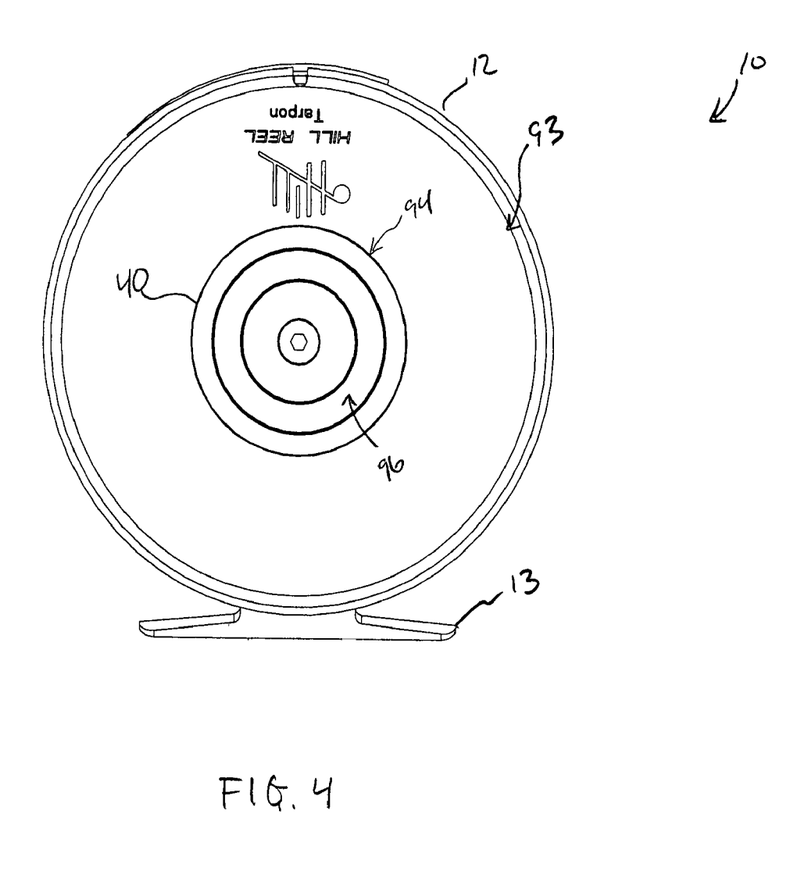
FIG. 4 is a plan view of the static drag adjuster knob according to one embodiment of the present invention.

The static drag mechanism 16 is connected to the brake mechanism 60 and allows the user to select a predetermined static or constant drag. In the preferred embodiment, the static drag mechanism 16 includes a static drag adjuster or knob 40 and one or more link pins 92. The knob 40 is preferably disposed on the outer surface 93 of the frame 12. The outer surface 94 (FIG. 4) of the knob 40 includes one or more protrusions 96 that allow the user to rotate the knob 40 to adjust the amount of static drag.

Figure 5A:
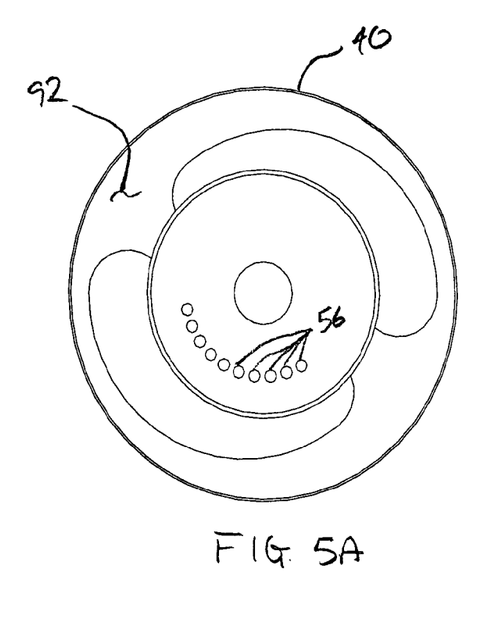
FIG. 5A is an perspective view of the knob shown in FIG. 4 according to the present invention.
Figure 5B:
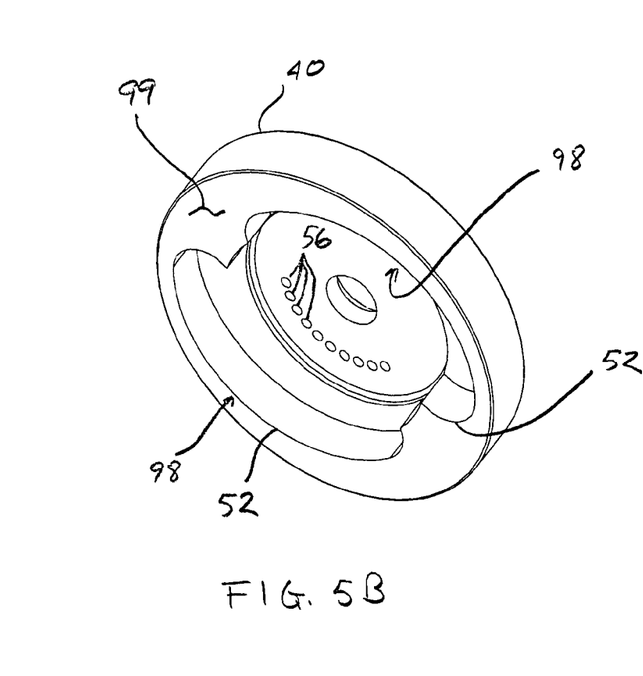
FIG. 5B is another perspective view of the knob shown in FIG. 4 according to the present invention.
Figure 6:
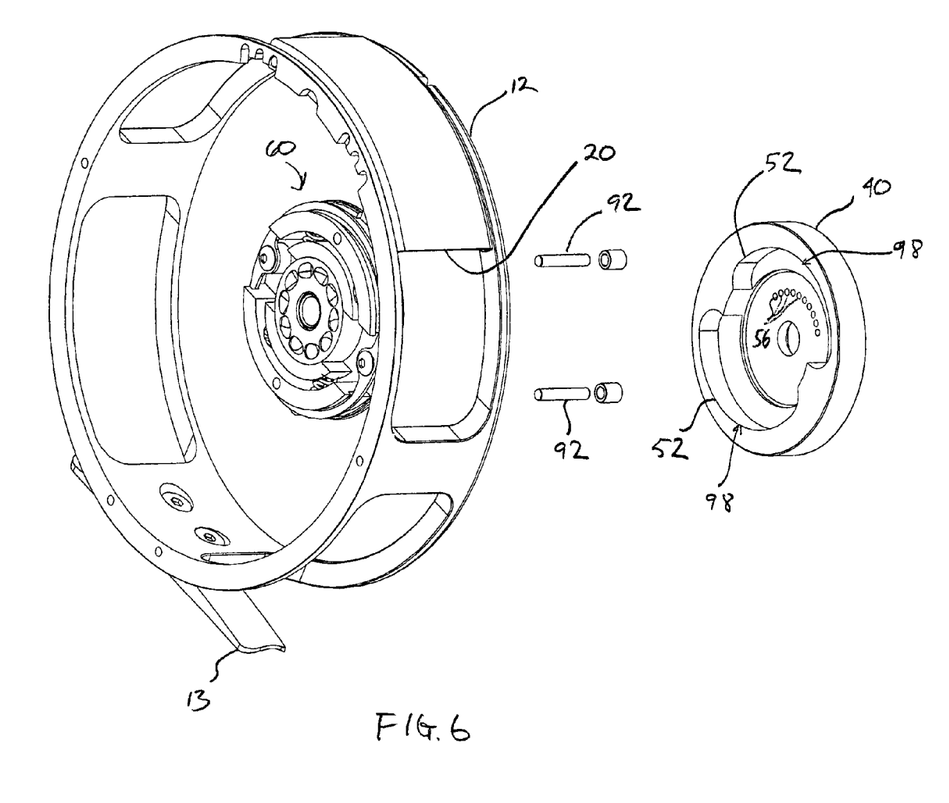
FIG. 6 is a partial exploded view of the fishing real and the static drag adjuster knob shown in FIG. 4.
Figure 7:
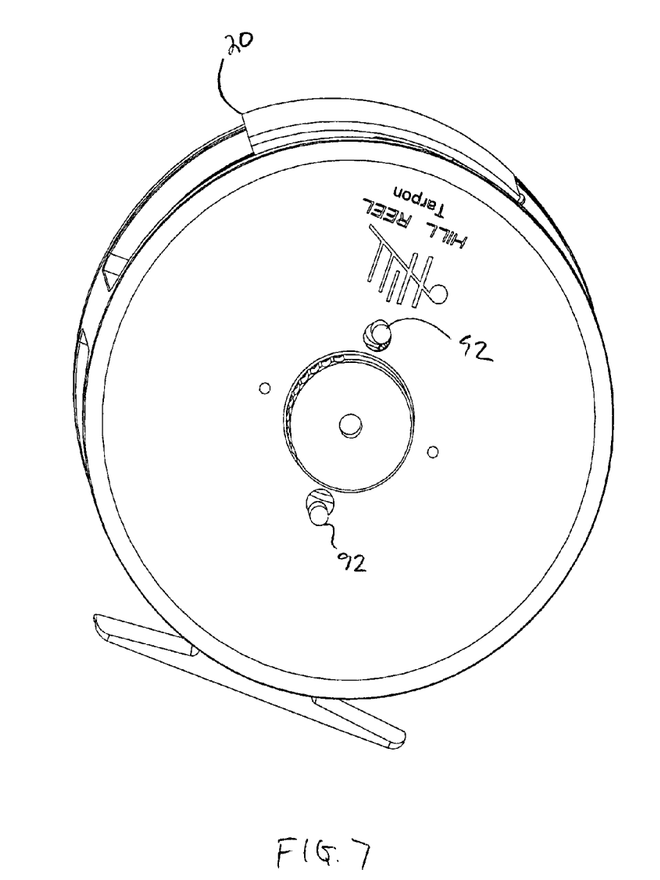
FIG. 7 is a plan view of the static drag mechanism shown according to one embodiment of the present invention.

The knob 40 preferably includes a cam 98, FIGS. 2, 5, and 6, disposed on the inner surface 99 of the knob 40. The cam 98 may include any cam design known to those skilled in the art, but preferably includes one or more curved channels 52 having a circumferentially decreasing radius. The link pins 92, FIGS. 2, 6, and 7, are disposed through the frame 12 and are connected at one end with the brake mechanism 60. The other ends of the linking pins 92 are disposed within the curved channel 52 of the cam 98. In practice, the user adjusts the amount of static drag by rotating the knob 40 using the protrusions 96 that in turn rotates the cam 98. As the cam 98 rotates, the linking pins 92 move radially inward or outward against the outer perimeter of the curved channel 52 which increases and decreases the force exerted on the braking mechanism 60.

It is important to note that the linking pins 92 rest against the outer perimeter of the curved channel 52 and that the inner perimeter of the curved channel 52 is substantially the same as the diameter of the ratchet 62. This is important when the static drag mechanism 16 and the dynamic drag mechanism 14 are connected to the same braking mechanism 60. The space between the inner and outer perimeter of the curved channel 52 allows the linking pins 92 to move inwardly when additional pressure is exerted on the braking mechanism 60 through the dynamic drag mechanism 14.

The static drag brake mechanism 16 may also include a detent plunger 54 and a spring 55 that serves to indicate, using an audible "click" sound, the current amount and adjustment of static drag brake mechanism 16. The detent plunger 54 and spring 55 ratchet in a plurality of indicator holes 56 that are disposed on the knob 40 thus causing the "clicking" sound. Alternative means of indicating the relative amount of static drag including, but not limited to, visual, touch, and audible indicators are also contemplated.

The dynamic drag mechanism 14, FIGS. 1–3, includes a lever 20 that is pivotably mounted to the frame 12 about a pivot point 34. In the preferred embodiment, the lever 20 is located proximate a top portion 15 of the frame 12 and is slightly recessed within the frame 12. Having the lever 20 located proximate the top portion 15 of the frame 12 and slightly recessed allows the lever 20 to be disposed out of the way and minimizes the likelihood of that the fishing line may become caught-up or tangled when a fish runs and slack line must be cleared from the deck of a boat or other area. Additionally, this position facilitates access to the lever 20 and allows the lever 20 to be compatible with both left and right-handed users. However, the exact location of the lever 20 is not a limitation of the present invention.

The lever 20 is in communication with the brake mechanism 60 in any manner known to those skilled in the art, but is preferably connected to the brake mechanism 60 with linkage 30. Linkage 30 may include any known method of transferring the force, such as, but not limited to, gears, cams, belts, hydraulics, etc. In a preferred embodiment, the linkage 30 includes a rod 86 that is connected at one end 83 to the brake mechanism 60 in any manner known to those skilled in the art. The other end 84 of the rod 86 includes a pin or paddle 82 that slides within a channel 88 (best shown in FIG. 8) disposed in the lever 20 (preferably along an outer perimeter of the lever 20). The position of the rod 86 is fixed such that the rod 86 can only move in the direction of the arrow C.

Figure 8:
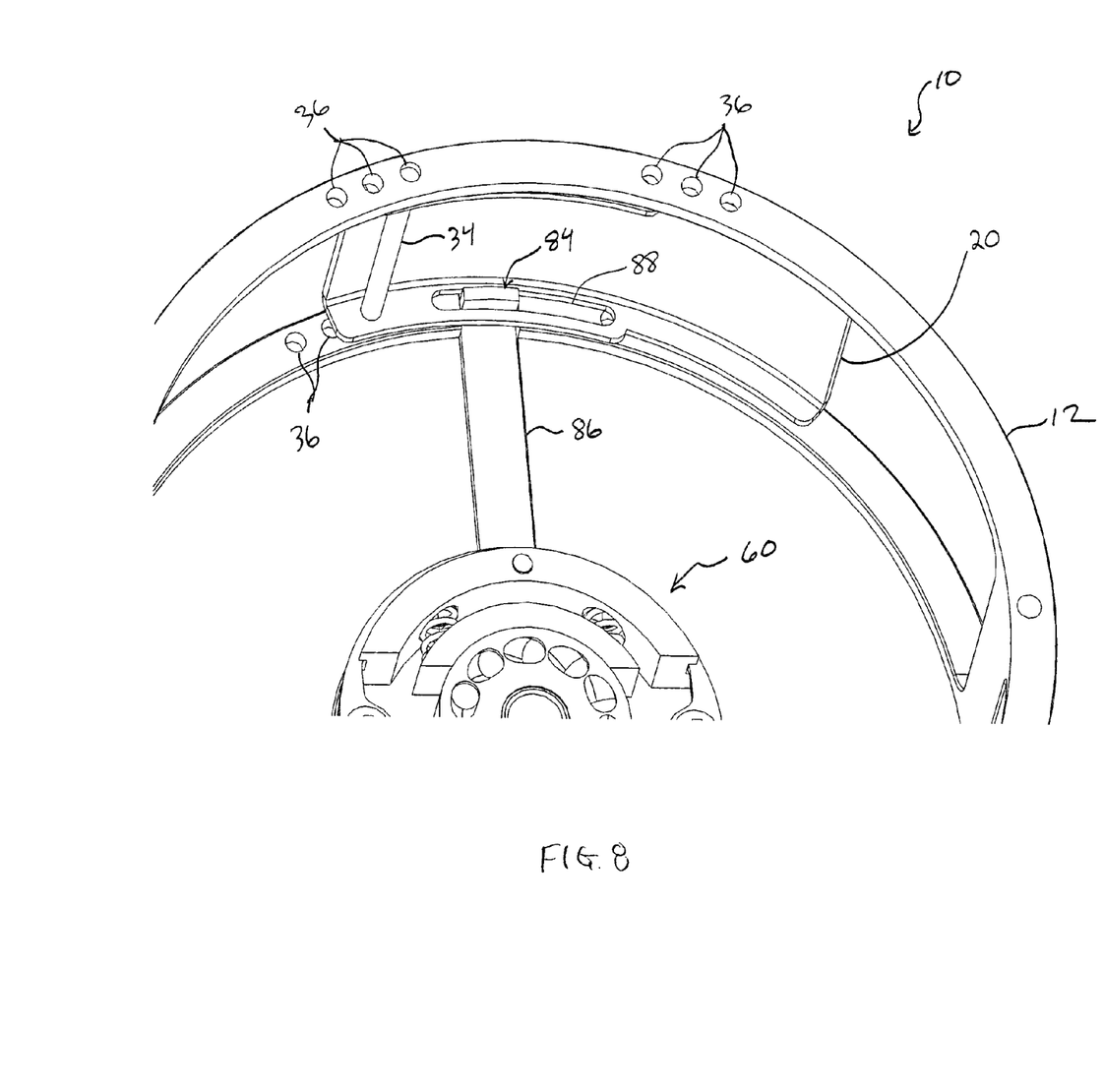
FIG. 8 is a partial perspective view of the lever and linkage according to one embodiment of the present invention.
Figure 9:
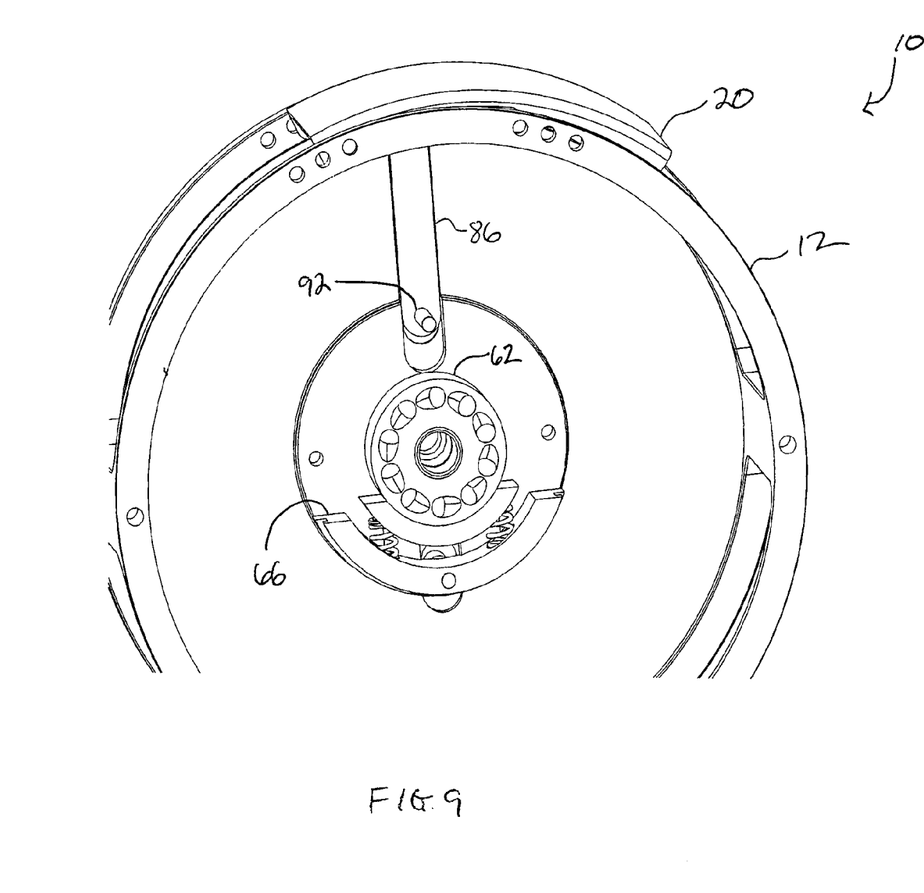
FIG. 9 is a partial exploded view of the reel shown in FIG. 1 according to one embodiment of the present invention.

In use, the user applies a force or pressure proximate the end 90 of the lever 20 opposite the pivot point 34. This force moves the end 90 of the lever 20 generally downward about the pivot point 34 in the direction of the arrow B. The pin or paddle 82 consequently slides within the channel 88 of the lever 20 and moves the rod 86 in the direction of the arrow C. As the rod 86 moves towards the ratchet plate 62, more drag is applied.

According to another embodiment, the dynamic drag mechanism 14 also includes an adjustable leverage mechanism 32. The adjustable leverage mechanism 32 allows the user to select the desired amount of mechanical advantage, thus permitting the user to customize the fishing reel 10 and the drag mechanism 11 for various types/sizes of anticipated fish as well as individual user's strengths. The adjustable leverage mechanism 32 preferably includes a shaft 34 and a plurality of adjustable pivot points 36. In the preferred embodiment, the pivot points 36 are labeled such that the user will know what the maximum amount of dynamic drag may be added. To alter the amount of mechanical leverage, the user simply moves the shaft 34 into a different set of adjustable pivot points 36. By moving the shaft 34 into a pivot point further away from the linkage 30, the leverage is effectively reduced.

An important feature of the present invention is the ability to set a maximum total drag. The maximum total drag is set by first adjusting the static drag mechanism 16 to the desired level which sets the minimum drag. Next, the user adjusts the adjustable leverage mechanism 32. For example, if the user wants 3 lbs. of static drag and no more than 14 lbs. of total drag, the user simply adjusts the static drag mechanism (preferably using the detents 56) to the setting for 3 lbs. Next, the user adjusts the adjustable leverage mechanism 32 by altering the mechanical leverage by selecting the appropriate pivot point 36 such that the user can only apply at most 11 lbs. of dynamic drag. When the lever 20 is fully depressed, the pin 92 of the rod 86 will bottom out at point 100 on the reel 10 such that the lever 20 can not be depressed any further. Consequently, by adjusting the mechanical leverage of the lever 20, the maximum amount of force generated by the lever 20 will be set (e.g., at 11 lbs.) when the lever 20 bottoms out at point 100 such the user cannot add any more additional drag. In this manner, the fishing reel 10 will prevent the user from accidentally adding too much dynamic drag which could result in the total drag exceeding the strength of the line.

Modifications and substitutions by one of ordinary skill in the art are considered to be within the scope of the present invention, which is not to be limited except by the following claims.

What is claimed is:

1. A fishing reel comprising:
    a frame adapted to rotatably support a spool adapted to contain a line thereon;
    a brake comprising:
        a static drag mechanism applying a static resistance against rotation of said spool wherein said static resistance includes a constant, minimum amount of resistance against rotation of said spool, said static drag mechanism including a static drag controller, wherein said static drag controller is adjustable and sets a constant, minimum amount of resistance against rotation of said spool; and
    a manually adjustable dynamic drag mechanism applying a dynamic resistance against rotation of said spool, said manually adjustable dynamic drag mechanism including a dynamic drag controller, wherein said dynamic drag controller is adjustable and limits a maximum amount of dynamic resistance that a user can apply irrespective of how much force a user applies to said manually adjustable dynamic drag mechanism.

2. The fishing reel as claimed in claim 1 wherein said brake includes:
    a ratchet plate disposed coaxially with said spool supported by said frame;
    a friction ring substantially surrounding an outer surface of said ratchet plate; and
    a yoke substantially surrounding an outer perimeter of said friction ring.

3. The fishing reel as claimed in claim 1 wherein said brake includes a caliper and a brake rotor, and wherein said brake rotor is disposed coaxially with said spool supported by said frame.

4. The fishing reel as claimed in claim 1 wherein said static drag mechanism includes:
    a static drag selection device, disposed on an outside surface of said frame, and coupled to a static drag adjustment cam; and
    an adjustment link pin disposed between said static drag adjustment cam and said brake wherein said static resistance against rotation of said spool is adjusted by rotating said static drag selection device thereby rotating said static drag adjustment cam, which in turn moves said adjustment link pin thereby altering said static resistance against rotation of said spool exerted by said brake mechanism.

5. The fishing reel as claimed in claim 4 wherein said static drag adjustment cam comprises a curved channel having a circumferentially decreasing radius.

6. The fishing reel as claimed in claim 1 wherein said a manually adjustable dynamic drag mechanism comprises:
    a lever, pivotably disposed about an exterior region of said frame proximate a top portion of said frame such that said lever is substantially even with an outer surface of said frame; and
    linkage connecting said lever to said brake.

7. The fishing reel as claimed in claim 6 wherein said manually adjustable dynamic drag controller further comprises an adjustable leverage mechanism.

8. The fishing reel drag mechanism as claimed in claim 7, wherein said adjustable leverage mechanism includes a plurality of adjustable pivot points disposed in said frame wherein a first end of said lever pivots about a pivot pin dispose within one of said plurality of pivot points.

9. The fishing reel as claimed in claim 6 wherein said lever is disposed such that said lever does not substantially protrude past an outer perimeter of said frame.

* * * * *